United States Patent
Gala et al.

(10) Patent No.: US 12,094,443 B2
(45) Date of Patent: *Sep. 17, 2024

(54) SYSTEMS AND METHODS FOR STREAMLINING MULTIMEDIA CONTENT ACQUISITION

(71) Applicant: Netflix, Inc., Los Gatos, CA (US)

(72) Inventors: Shyam Gala, Sunnyvale, CA (US); Katheryn Shi, Palo Alto, CA (US); Christopher Gray, Burlingame, CA (US); Suudhan Rangarajan, San Jose, CA (US); Manuel Correa, San Jose, CA (US); Pablo Pissanetzky, Scotts Valey, CA (US); Bertrand Mollinier Toublet, Santa Clara, CA (US); Niranjan P. Ghate, Fremont, CA (US); Raymond Walsh, San Jose, CA (US); Edward H. Barker, Sunnyvale, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,303

(22) Filed: Aug. 28, 2023

(65) Prior Publication Data

US 2023/0419941 A1 Dec. 28, 2023

Related U.S. Application Data

(63) Continuation of application No. 17/079,352, filed on Oct. 23, 2020, now Pat. No. 11,741,930.
(Continued)

(51) Int. Cl.
*G10K 11/178* (2006.01)
*G06F 21/10* (2013.01)
(Continued)

(52) U.S. Cl.
CPC .......... *G10K 11/178* (2013.01); *G06F 21/10* (2013.01); *H04L 65/70* (2022.05); *H04L 65/75* (2022.05);
(Continued)

(58) Field of Classification Search
CPC ......... G10K 11/178; G10K 2210/1281; G10K 2210/1053; G10K 11/17821;
(Continued)

(56) References Cited

U.S. PATENT DOCUMENTS 6,108,340 A   8/2000 Rolfe
10,863,211 B1 12/2020 Wu
(Continued)

OTHER PUBLICATIONS

Final Office Action dated Dec. 14, 2022, for U.S. Appl. No. 17/079,352; 27 pages.
(Continued)

*Primary Examiner* — Adil Ocak
(74) *Attorney, Agent, or Firm* — Greenberg Traurig, LLP

(57) ABSTRACT

The disclosed computer-implemented method may include receiving, from a client device, a request for multimedia content, where the request includes both a manifest request that includes client identification data and a license request that includes a license challenge. The method may further include validating the received request for multimedia content using the client identification data in the manifest request and generating a manifest response that includes an identification of a specified multimedia content stream that is to be provided to the client device. The method may also include acquiring at least one license in response to the license request, where the license includes a response to the license challenge having various content keys, and then providing the specified multimedia content stream, including the generated manifest response and the acquired
(Continued)

license, to the client device. Various other methods, systems, and computer-readable media are also disclosed.

20 Claims, 11 Drawing Sheets

Related U.S. Application Data

(60) Provisional application No. 62/926,207, filed on Oct. 25, 2019.

(51) Int. Cl.
*H04L 65/70* (2022.01)
*H04L 65/75* (2022.01)
*H04N 21/254* (2011.01)

(52) U.S. Cl.
CPC . *H04N 21/2541* (2013.01); *G10K 2210/1281* (2013.01)

(58) Field of Classification Search
CPC .......... G10K 11/1783; G10K 11/17873; G06F 21/10; H04L 65/70; H04L 65/75; H04N 21/2541
See application file for complete search history.

(56) References Cited

U.S. PATENT DOCUMENTS

| | | |
|---|---|---|
| 2004/0133914 A1 | 7/2004 | Smith |
| 2010/0235528 A1 | 9/2010 | Bocharov |
| 2012/0331293 A1 | 12/2012 | Ma |
| 2017/0346865 A1 | 11/2017 | Hartman |

OTHER PUBLICATIONS

International Search Report and Written Opinion dated Feb. 5, 2021, for International Application No. PCT/US2020/057338; 10 pages.

SYSTEMS AND METHODS FOR STREAMLINING MULTIMEDIA CONTENT ACQUISITION

CROSS REFERENCE TO RELATED APPLICATION

This application is a Continuation of patent application Ser. No. 17/079,352, filed Oct. 23, 2020, which claims priority to and the benefit of U.S. Provisional Patent Application No. 62/926,207, filed Oct. 25, 2019, the disclosures of which are incorporated, in their entirety, by this reference.

BACKGROUND

In traditional multimedia content provisioning systems, when a user initiates playback of a movie, video, or song, the user's client device typically creates a content request. The content request specifies which media content is to be provided. The content request may further include information about the playback device being used to playback the media and, optionally, information about the user or a user's subscription to a content provisioning service. The user typically initiates playback of the media content by pushing a "play" button. The amount of time the user waits between hitting the "play" button and actually receiving the media content may be irksome if the time is too lengthy. For example, if a user hits "play" on an on-demand movie or a television show and has to wait more than five to ten seconds, the user will likely become frustrated and may terminate playback of the video. This may lead users to become discontent with the video service, and may drive the users away from the video provisioning service.

SUMMARY

As will be described in greater detail below, the present disclosure describes embodiments in which content acquisition is streamlined by combining manifest requests and licensing requests. This combining of requests may greatly reduce the amount of time a user has to wait before receiving and viewing their requested multimedia content.

In one example, a computer-implemented method for streamlining content acquisition may include receiving, from a client device, a request for multimedia content, where the request includes both a manifest request that has client identification data and a license request that includes a license challenge. The method may further include validating the received request for multimedia content using the client identification data in the manifest request, and generating a manifest response that includes an identification of a specified multimedia content stream that is to be provided to the client device. The method may also include acquiring at least one license in response to the license request, where the license includes a response to the license challenge having various content keys. The method may further include providing the specified multimedia content stream, including the generated manifest response and the acquired license, to the client device.

In some examples, the multimedia content is provided to the client device via one or more multimedia content streams. In some embodiments, the method further includes determining which multimedia content streams to provide to the client based on portions of information provided in the received manifest request. In some cases, the portions of information provided in the manifest request includes an indication of the client device's device type, an indication of a network to which the client device is connected, an indication of an identity of a user associated with the client device, an indication of a television show or movie that the user is attempting to watch, or an indication of account settings associated with the user.

In some embodiments, identifying the specified multimedia stream that is to be provided to the client device may include identifying at least one of a specific encoding type, a specific resolution, a specific audio format, or a specific language. In some examples, identifying the specified multimedia stream that is to be provided to the client device may include identifying at least one content delivery network node that has stored thereon the requested multimedia content in the specified format. In some cases, the steps of identifying at least one content delivery network node that has stored there on the requested multimedia content in the specified format and acquiring at least one license in response to the license request are performed in parallel.

In some cases, the specified multimedia content stream may be at least initially provided to the client device using a limited duration license. In some examples, the manifest request provided by the client device may include a specified minimum set of information needed to acquire at least one license for the specified multimedia content stream. In some embodiments, the specified minimum set of information needed to acquire at least one license for the specified multimedia content stream may include a minimum set of information used by a digital rights management (DRM) application programming interface (API) to access the license. In some examples, the content keys provided in the license response to the license challenge may be identified based on information received in the manifest request from the client device.

In addition, a corresponding system may include at least one physical processor and physical memory comprising computer-executable instructions that, when executed by the physical processor, cause the physical processor to: receive, from a client device, a request for multimedia content, the request including both a manifest request that includes client identification data and a license request that includes a license challenge, validate the received request for multimedia content using the client identification data in the manifest request, generate a manifest response that includes an identification of a specified multimedia content stream that is to be provided to the client device, acquire at least one license in response to the license request, the license including a response to the license challenge having various content keys, and provide the specified multimedia content stream, including the generated manifest response and the acquired license, to the client device.

In some examples, the request for multimedia content received from the client device may include a prefetch request. In some cases, the license acquired in response to the license request may include a limited duration license or a standard duration license. In some embodiments, the request for multimedia content may include a batch of multiple license challenges for a respective plurality of multimedia content resolutions, and the system may generate references to track which content keys are referred to in each license challenge.

In some cases, the system receives further license requests with at least one challenge that identifies one or more additional content keys that are to be provided to the client device in the response to the license challenge. In some embodiments, the system implements heuristics to predict which multimedia content a user will select from a set of available multimedia content items. In some cases, the system preemptively acquires multimedia content licenses based on which multimedia content items the user is predicted to select. In some examples, the system further receives and implements a previously used license challenge from the client device, allowing the client device to avoid minting at least one license challenge.

In some examples, the above-described method may be encoded as computer-readable instructions on a computer-readable medium. For example, a computer-readable medium may include one or more computer-executable instructions that, when executed by at least one processor of a computing device, cause the computing device to: receive, from a client device, a request for multimedia content, the request comprising both a manifest request that includes client identification data and a license request that includes a license challenge, validate the received request for multimedia content using the client identification data in the manifest request, generate a manifest response that includes an identification of a specified multimedia content stream that is to be provided to the client device, acquire at least one license in response to the license request, the license including a response to the license challenge having various content keys, and provide the specified multimedia content stream, including the generated manifest response and the acquired license, to the client device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
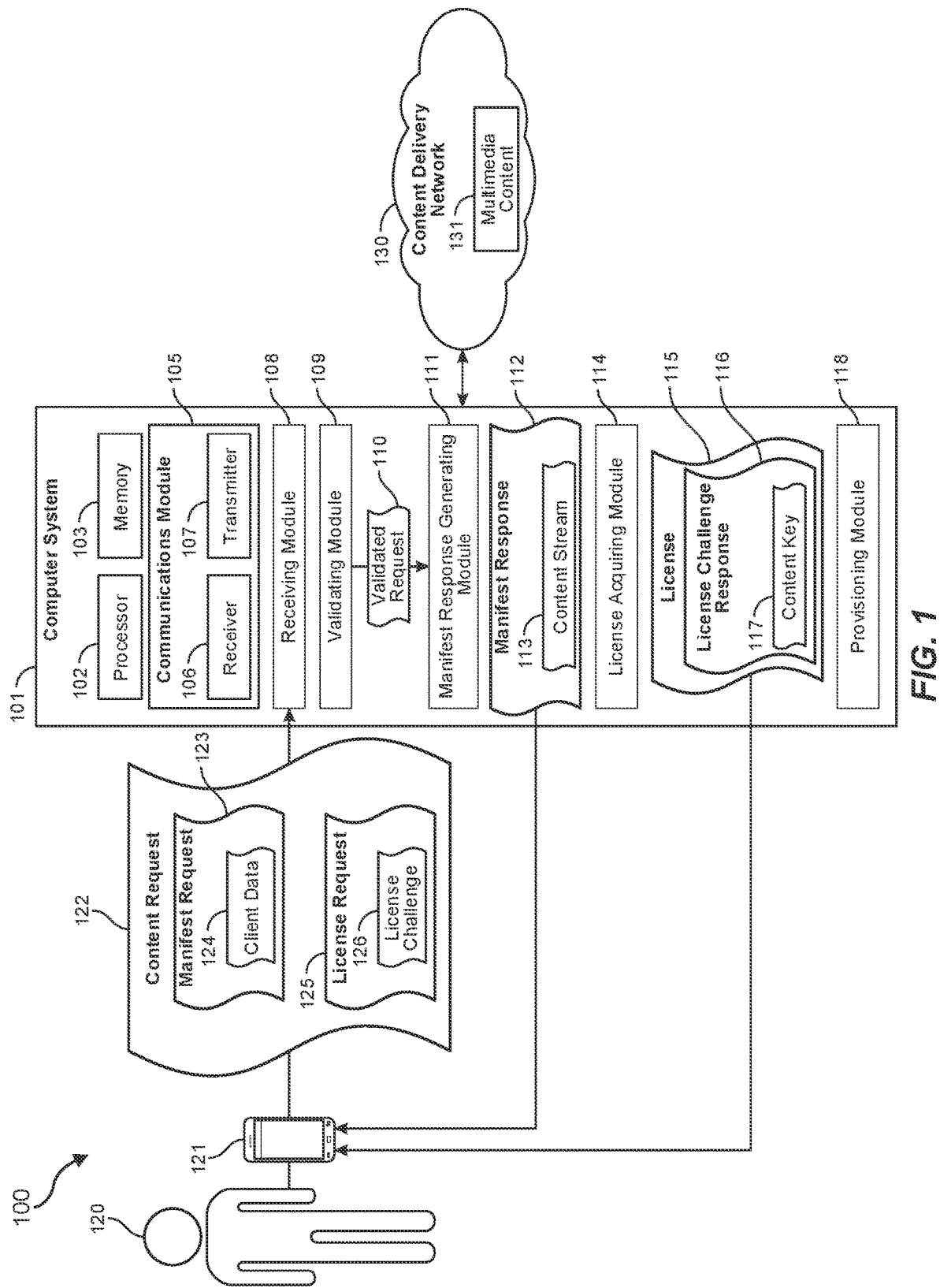
FIG. 1 illustrates a computing environment in which content acquisition is streamlined by combining manifest requests and licensing requests.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a system for reducing the amount of time used to deliver media content to a user by combining manifest and license requests. In traditional systems, when a user initiated playback on a client device, for example, the client device would generate a manifest request and send it to a backend server. The manifest request would include information about the media item that was to be played back, information about the user and/or the electronic device requesting playback, and perhaps other information including language, audio format, screen resolution, etc. In some cases, the backend server would respond with a manifest response that had one or more content delivery network (CDN) links to deployed content. That deployed content would have the DRM header bytes embedded in the content. In other cases, the backend server would respond with a manifest response that included digital rights management (DRM) information provided in DRM headers. The DRM header information would provide data used by the client device to generate a license request and a license challenge. Once the client had received and processed the DRM information, the client device would generate a license request that included the license challenge. The license challenge would include some or all of the DRM header information received from the server.

Upon receiving the license request, including the license challenge, the server would access the license request and the DRM header information and attempt to validate the client. This validation would include various authentication steps necessary to establish the identity of the user or otherwise validate the user's device. For instance, if the requested media item was only available via a subscription, the server would attempt to validate the user to ensure that they had an active subscription to receive the requested media content. Once the server validated the user and ensured that the user had appropriate access to the requested media content, the server would attempt to acquire the appropriate licenses for the requested media content. In some cases, each language, each resolution, each video format, etc. would have its own unique license. As such, the information from the manifest would be used to determine which license to use and then acquire the appropriate license. Then, finally, the server would deliver the acquired license and the requested media content to the client device.

This traditional process of requesting and receiving media content may take many trips back and forth between a client device and a server. These back and forth trips may add unnecessary time delays to the interim period between the user pressing the "play" button and the media item actually playing back on the client device. These interim time delays may be exacerbated in cases where users have poor internet connections or high levels of latency between their devices and the backend servers. Time delays experienced by the user may detract from the overall media playback experience and may disincline the user toward future use of the media provisioning service if the delays are regular or persistent.

As will be explained in greater detail below, embodiments of the present disclosure may be configured to combine the manifest request and the license request into a single request, thus reducing the number of back-and-forth trips between the client device and the server by half (or potentially more). This may greatly reduce the amount of time the user spends waiting for their requested media content to begin playback, resulting in a more desirable and appealing media viewing experience. Moreover, combining the manifest request and the license request allows for backend server efficiencies including the ability to process various parts of the combined request in parallel. This allows the backend server to respond to the combined request faster than the sum of traditional individual requests when measured on the server. As will be apparent to one skilled in the art, however, simply adding a license request to a traditional manifest request is not possible in the past system described above. In that traditional system, the license request sent by the client device required DRM information that was only obtainable after sending the initial manifest request. Accordingly, the embodiments described below with regard to FIGS. 1-10 illustrate how the manifest request and the license request may be combined into a single request, and how the backend server may respond with a single response that includes both the appropriate license and the requested media content.

FIG. 1 illustrates a computing environment 100 in which the amount of time needed to deliver media content to a user may be reduced by combining manifest and license requests. FIG. 1 includes various electronic components and elements including a computer system 101 that may be used, alone or in combination with other computer systems, to perform tasks associated with license acquisition and provisioning. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 105 may be configured to communicate with other computer systems. The communications module 105 may include any wired or wireless communication means that can receive and/or transmit data to or from other computer systems. These communication means may include hardware radios including, for example, a hardware-based receiver 106, a hardware-based transmitter 107, or a combined hardware-based transceiver capable of both receiving and transmitting data. The radios may be WIFI radios, cellular radios, Bluetooth radios, global positioning system (GPS) radios, or other types of radios. The communications module 105 may be configured to interact with databases, mobile computing devices (such as mobile phones or tablets), embedded or other types of computing systems.

The computer system 101 may further include a receiving module 108. The receiving module 108 may be configured to receive information from a user (e.g., 120) or, more specifically, from an electronic client device 121 (also referred to as a "client device" or "client device 121" herein) associated with the user 120. The client device 121 may be substantially any type of electronic device configured to provide media content playback including smartphones, tablets, laptops, personal computers, televisions, gaming stations, streaming sticks, MP3 players, audio/video receivers, or other similar electronic devices. As will be appreciated, the media content requested by the user 120 may include substantially any type of multimedia including videos (e.g., movies, television shows, internet-hosted videos, etc.), images, audio items (e.g., songs, podcasts, soundtracks, etc.), presentation documents (e.g., slide decks), or other types of multimedia content.

The client device 121 may be configured to generate a content request 122 that includes both a manifest request 123 (with accompanying client identification data 124) and a license request (with an accompanying license challenge 126). The manifest request 123 may identify the media item that is requested by the user 120. The manifest request 123 may also include client identification data 124 which identifies the user 120 and/or the client device 121. This client data may include authentication information (e.g., a name and password or biometric data, etc.) used by the computer system 101 to authenticate or otherwise validate the user 120. The license request 125, as will be explained further below, may include a license challenge 126.

Whereas in traditional systems, the license request 125 would include DRM information obtained from the server in response to the manifest request, the license request 125 may include license challenges 126 for many different content types or content "flavors." As the term is used herein, a content "flavor" may indicate the type of encoding (e.g., MPEG 4, h.264, h.265, etc.), the audio format (e.g., stereo, Dolby Digital, MP3, etc.), the language of the dialogue (e.g., English, Spanish, French, etc.), the screen resolution (e.g., 1080i, 1080p, 4k, etc.), or combinations thereof. Thus, one content flavor may include an MPEG 4 encoding, Dolby Digital audio format, English language, and 4k resolution, while another content flavor may include h.264 encoding, Dolby Digital audio format, English language, and 1080p resolution. Thus, because the content request 122 does not have access to the traditional DRM information obtained in response to the traditional manifest request, the license request 125 may include multiple license challenges 126 for multiple content flavors. In some cases, as will be explained further below, the number of license challenges in a given request may depend on the client device being used and/or the version of the DRM software running on the client device. In some cases, when the client device issues a multi-key license challenge in a request, the client device may use heuristics or other logic to determine which license challenge(s) to put in the request. In this manner, heuristics or other logic may be used on the client device to narrow the scope of which keys are most likely to be used.

Next, the receiving module 108 of computer system 101 may receive the content request 122 from the client device 121. The validating module 109 of computer system 101 may be configured to validate and/or authenticate the user 120, or simply validate the content request as being legitimate and actionable. The validating module 109 may pass the validated request 110 to the manifest response generating module 111, which is configured to generate a manifest response 112. The manifest response generating module 111 may be configured to identify the location (e.g., the uniform resource locator (URL)) of the requested media content. In some cases, the media content 131 is hosted on a content delivery network 130 or other type of distributed computing network. The content delivery network (CDN) may include many hundreds or thousands of nodes physically located all over the world. The CDN may be configured to physically locate highly requested media content near those who are requesting that content. The manifest response generating module 111 may be configured to communicate with the content delivery network 130 to identify where particular content flavors are located, and provide the URL(s) back to the client device 121 in the manifest response 112. In this manner, the client may have access to the multimedia content stream 113 (or if desired and available, access to a content download).

In order to play back the streamed or downloaded content, the client device 121 will most likely need an appropriate license. While the manifest response generating module 111 is determining the location of the requested content flavor, the license acquiring module 114 may be configured to simultaneously acquire a license 115 for the requested content. The license acquiring module 114 may be configured to determine which of the license challenges 126 to respond to and acquire a license for the appropriate media content flavor. The license challenge response 116 may include a content key 117 that is used to access (or continue accessing) the multimedia content stream 113. The provisioning module 118 may be configured to provide the manifest response, the content stream, the license, the content key, and/or any other information used by the client device 121 for media playback. This process will be described in greater detail below, with regard to an introduction of the method described herein in FIG. 2, as well as a set of FIGS. 3A and 3B that draw a more in-depth comparison between traditional manifest and license acquisition systems and the currently described systems and embodiments.

Figure 2:
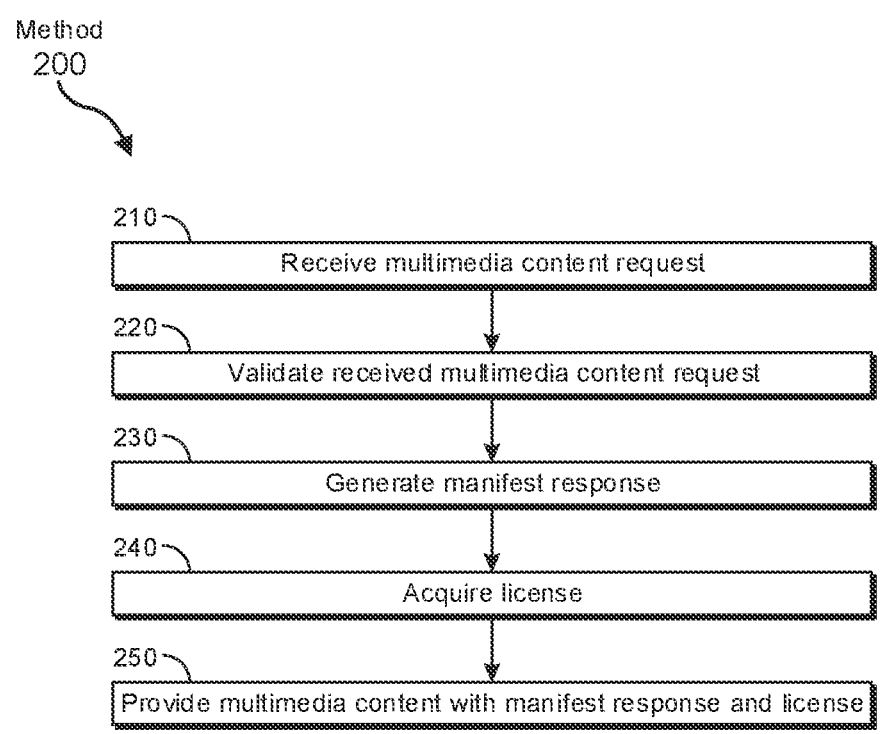
FIG. 2 is a flow diagram of an exemplary method for streamlining content acquisition by combining manifest requests and licensing requests.

FIG. 2 is a flow diagram of an exemplary computer-implemented method 200 for reducing the amount of time needed to deliver media content to a user by combining manifest and license requests. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein (e.g., computer system 101 of FIG. 1) may receive, from a client device 121, a request for multimedia content request 122. The multimedia content request 122 may include both a manifest request 123 that has client identification data 124 and a license request 125 that includes a license challenge 126. The method 200 may further include, at step 220, validating the received request for multimedia content using the client identification data 124 in the manifest request 123. The method 200 may then include, at step 230, generating a manifest response 112 that includes an identification of a specified multimedia content stream 113 that is to be provided to the client device 121. The method 200 may also include, at step 240, acquiring at least one license 115 in response to the license request 125. The license 115 may include a response to the license challenge (e.g., license challenge response 116) having one or more content keys 117. The method 200 may further include, at step 250, providing the specified multimedia content stream 113, including the generated manifest response 112 and the acquired license 115, to the client device 121.

Figure 3A:
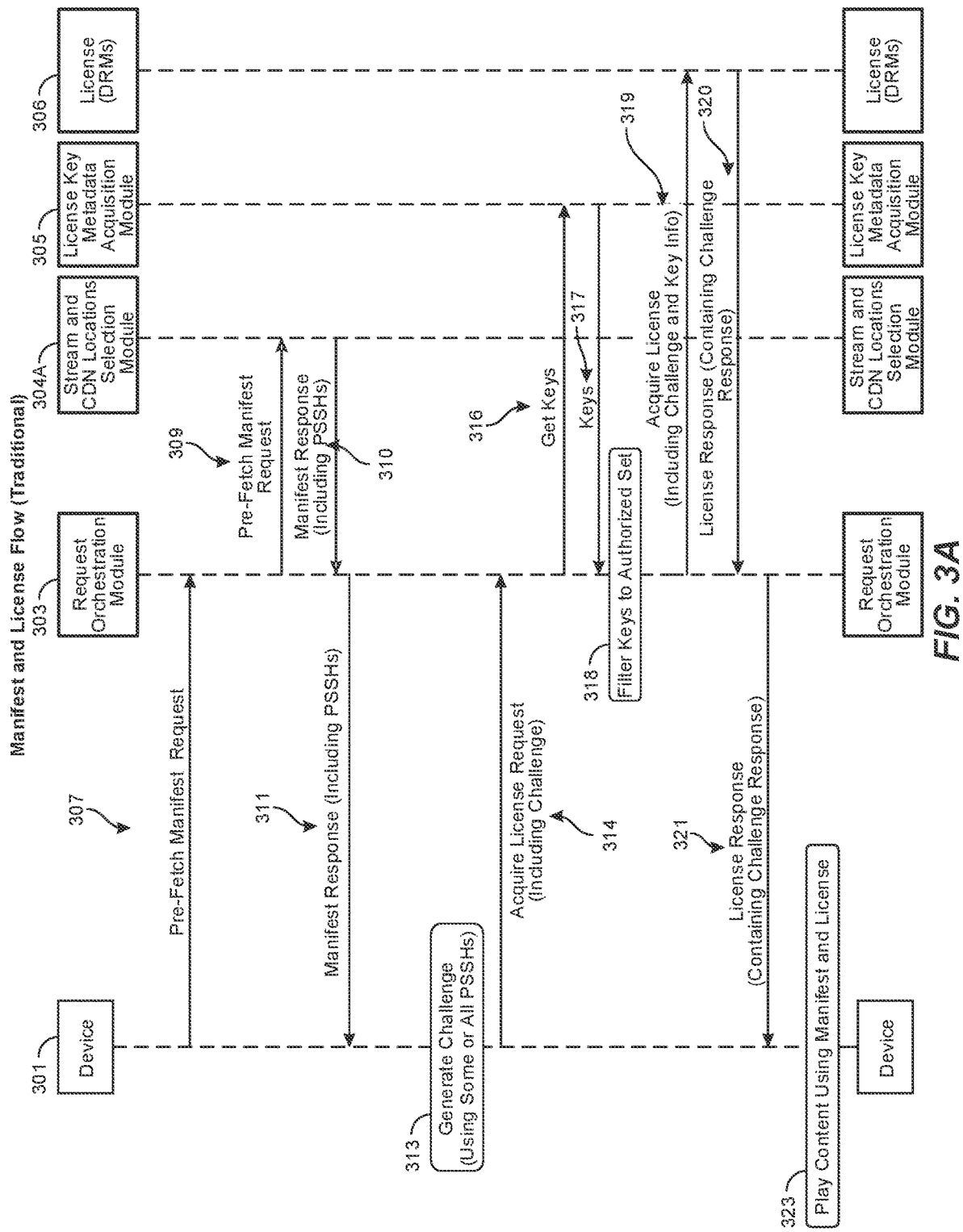
FIGS. 3A and 3B illustrate contrasting embodiments for streamlining content acquisition.
Figure 3B:
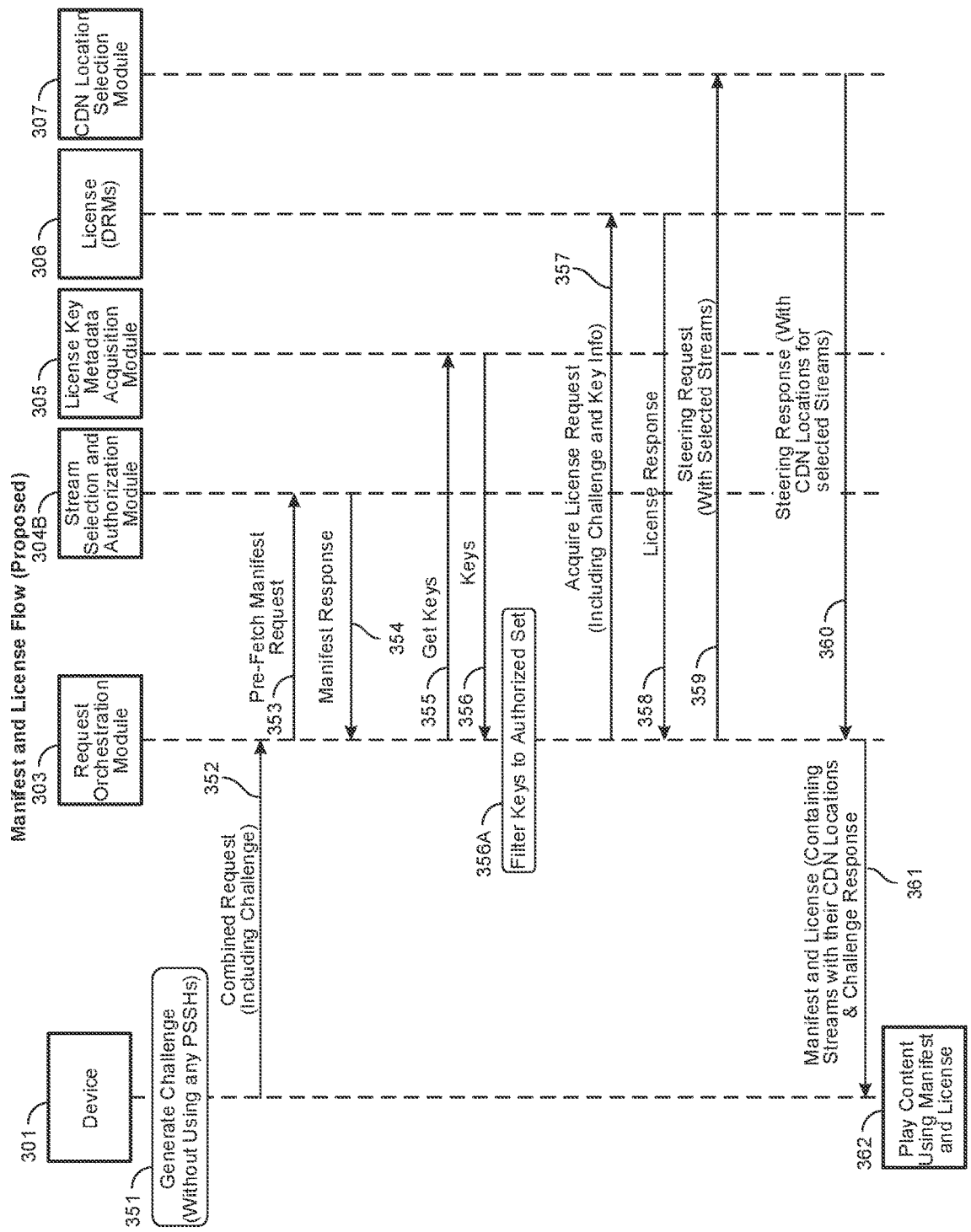

FIGS. 3A and 3B illustrate flow diagrams highlighting, in a detailed manner, the differences between traditional manifest and license provisioning systems (FIG. 3A) and the current, updated manifest and license provisioning system described herein that combines manifest and license acquisition, thereby reducing the number of round trips needed for a client device to obtain the information needed for playback to start. It should be noted here that manifest requesting may occur in a "standard" manner or in a "pre-fetch" manner. In a "pre-fetch" manner, the manifest request is sent by the client device in an anticipatory manner. For example, if the user 120 is browsing a selection screen that offers multiple different media content items, the client device may send manifest pre-fetch requests for one or more media items which are likely to be selected (but have not yet been selected) by the user. The "standard" manner refers to scenarios in which the user has actually selected a media item (e.g., by touching or clicking on its title or artwork representation or on an associated "play" button). The embodiments described herein are designed to work with both standard manifest requests and manifest pre-fetch requests. Moreover, when the computer system 101 provides a license, that license may be a standard license that applies to the full-length video, or the license may be a limited-duration license (LDL) that allows playback onset and up to a few minutes of playback, after which a standard license is obtained and used. As with the standard and pre-fetch manifest requests, the embodiments described herein are designed to work with both standard media content licenses and limited-duration licenses.

FIG. 3A generally describes two relevant stages of license-related security: encoding and playback. At encoding time in this traditional system, content is encrypted and encoded, generating one (in the case of a Per-Title Key (PTK)) or more (in the case of a Per-Resolution Key (PRK)) content keys per media content item. As part of Common Encryption, the system may create protection system specific headers (PSSHs) that provide information (including the key identifier and encryption algorithm identifier) that each DRM system uses as part of creating the license challenge, which is ultimately used to acquire a license. Within the playback lifecycle, there may be two separate calls: a manifest fetch and license acquisition. First, at step 307, the client device 301 makes a manifest request and sends the manifest request to the Request Orchestration Module 303. In some cases, the Request Orchestration Module 303 may include or implement an application programming interface (API) that controls or manages playback of the requested media item. The Request Orchestration Module 303 may then pass the manifest request to the Stream and CDN Locations Selection Module 304A at step 309. Additionally, at step 309, the Stream and CDN Locations Selection Module 304A may select media content streams and may identify the location of the streams within the CDN. These actions at step 309 occur serially in the traditional system.

The manifest response generated by the Stream and CDN Locations Selection Module 304A (which includes the generated PSSHs) is then sent back to the Request Orchestration Module 303 at step 310 and is sent to the client device 301 at step 311. The client device 301 then generates, at step 313, an acquire license request using some or all of the PSSHs received in the manifest response. This acquire license request includes a license challenge that is generated by the client device's content decryption module (CDM). The challenge includes some or all of the PSSHs returned in the manifest response. The client device 301 sends the generated license request (including the challenge) to the Request Orchestration Module 303 at step 314.

The Request Orchestration Module 303 processes the license request by passing the request to the License Key Metadata Acquisition Module 305 (in some cases, without modification) at step 316 and further sends a set of headers that the client device 301 is authorized for. This set of headers may differ from the set within the license challenge generated by the client device 301. The License Key Metadata Acquisition Module then, at step 317, selects a subset of available keys. This subset of keys may represent the intersection between the license challenge and the video playback context. As such, this subset of keys may include those keys that the client is authorized to use during video playback. Thus, at step 318, the Request Orchestration Module 303 may filter the keys to include an authorized set of keys used to acquire a license. The Request Orchestration Module 303, at step 319, sends a request to acquire a license which includes the license challenge and the specified key information. The license DRM service 306, then uses the challenge to validate that the client device 301 is secure and can be trusted with a license. After these validations, the license DRM service 306 generates a license, at step 320, containing the license challenge response and returns the license back to the Request Orchestration Module 303. The license response contains the actual content keys for the client device 301 to use for media playback. The Request Orchestration Module 303 then returns the license response back to the client device at step 321. The client device 301 can then play the media content using the license, at step 323, by providing the license to its CDM.

In contrast to the traditional method illustrated in FIG. 3A, the current embodiments eliminate many of the steps that were previously involved in the traditional method. In FIG. 3B, for example, a client device 301 may generate, as a first step (351), a combined manifest and license challenge. Rather than the client device 301 itself making the separate manifest and license call, some of these calls may be moved into different server-side layers. As such, the server (e.g., modules 303-307) would only receive one (combined) call from the client device 301. The Request Orchestration Module 303 or other server modules may be responsible for splitting the combined call into separate calls and then combining the results and returning the results to the client device 301. Traditionally, license challenge generation would take as an input the specific PSSH corresponding with a requested license key. The PSSH used for challenge generation would be provided via the video playback context. Since in FIG. 3B, the client device 301 generates its challenge at step 351 without any PSSHs from the manifest at challenge generation time, the client device will instead generate a license challenge without using a valid PSSH. Thus, the combined request 352 sent by the client device includes a license challenge that lacks the traditional PSSH header information.

The Request Orchestration Module 303 receives the combined request 352 and then sends a manifest request, at step 353, to the Stream Selection and Authorization Module 304B. The Stream Selection and Authorization Module 304B may then generate a manifest response 354 with selected and authorized streams and send the manifest response to the Request Orchestration Module 303. The Request Orchestration Module 303 may then access one or more license keys, at step 355, from the License Key Metadata Acquisition Module 305. The License Key Metadata Acquisition Module 305 may then provide the keys at step 356.

In contrast to previous systems where the server determined which keys to send to the client using the DRM header information, the server (e.g., one of modules 303-307) determines which keys to provide based on which streams were selected in the combined request 352. The Request Orchestration Module 303 may filter the keys to an authorized set at step 356A, and send an acquire license request at step 357 including the license challenge and key information received from the License Key Metadata Acquisition Module 305. The license DRM service 306 may only be able to use the header information provided by the Request Orchestration Module 303 as its guidance on which keys to return in the license challenge response. The license DRM service 306 may then acquire the content license and provide a license response at step 358. In step 359, the Request Orchestration Module 303 may send a content steering request (with an identification of selected content streams) to the CDN Location Selection Module 307. The CDN Location Selection Module 307 may be configured to identify where on the content delivery network the selected content streams are located and may return a content steering response, at step 360, to the Request Orchestration Module 303. The content steering response may include URL links to the identified content streams. In some cases, it should be noted, steps 357-358 and/or steps 359-360 (along with potentially other steps in the flow of FIG. 3*b*), may be performed in parallel. The Request Orchestration Module 303 may then send the manifest response and license (including the license challenge response) back to the client device 301 at step 361. The client device 301 may then play back the requested content, at step 362, using the received manifest and license challenge response.

Figure 4:
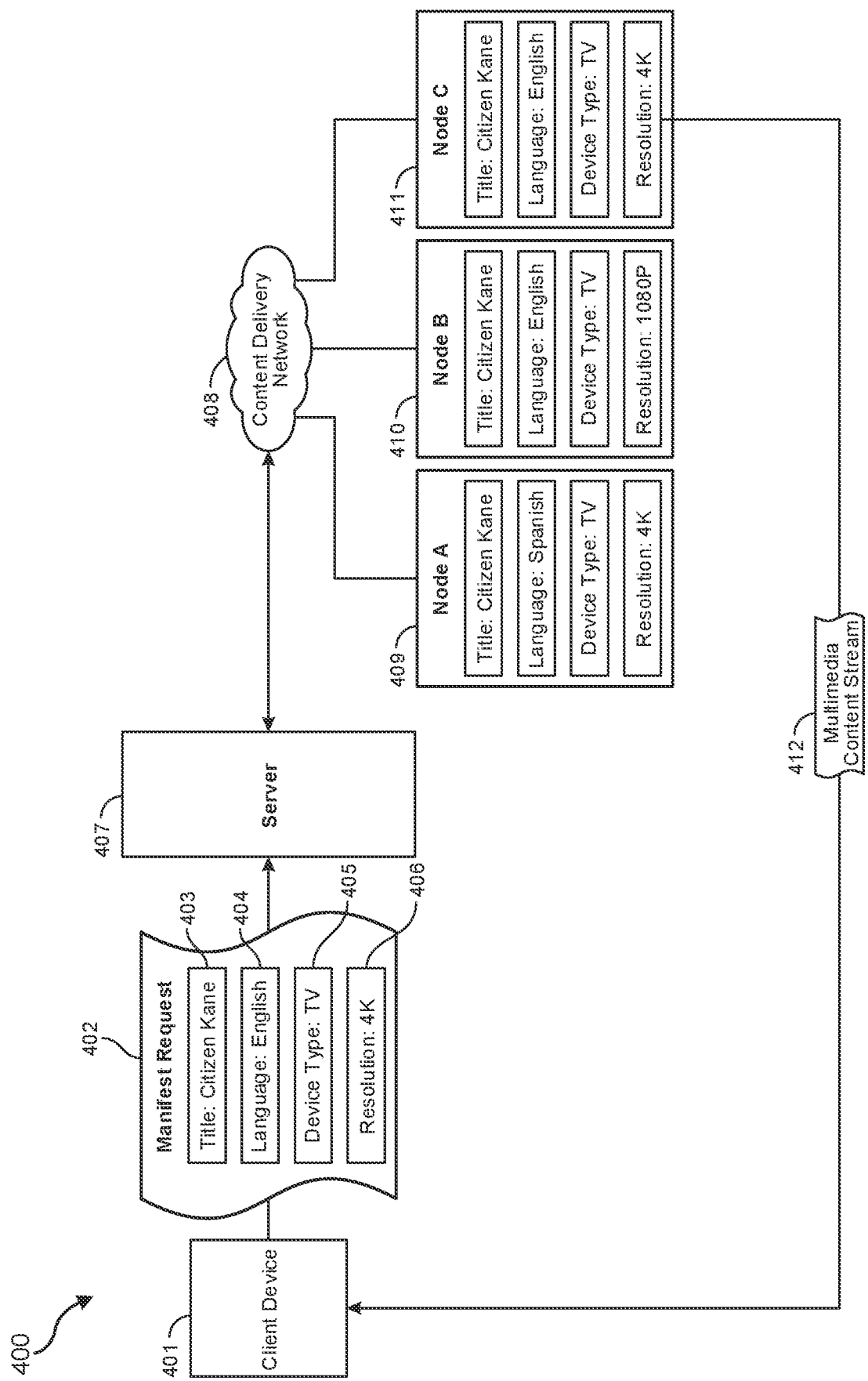
FIG. 4 illustrates a computing environment in which specific license challenges are issued for specific playback implementations.

Within the process shown in FIG. 3B, the various modules and components (e.g., 301 and 303-307) pass information, including license challenges, manifest, keys, etc. back and forth between each other. It will be understood that, while modules 303-307 are shown as separate components, any or all of these components may be combined into a single "server" component. In such cases, the functions performed by modules 303-307 would be performed "server side" and the other functions would be performed by the client device 301. As such, the server 407 shown in FIG. 4 may include some or all of the modules 303-307 of FIG. 3B. In FIG. 4, the client device 401 (which may be the same as or different than client device 301 of FIG. 3) may request specific multimedia content. In the example computing environment 400 shown in FIG. 4, the media is provided in a multimedia content stream 412. The client device 401 may specify which flavor of media content is to be provided in the manifest request 402. The manifest request 402 may include various portions of information from which the server 407 may determine which multimedia content streams to provide to the client device 401.

The various portions of information provided in the manifest request 402 may include an indication of the client device's device type, an indication of a network to which the client device is connected, an indication of an identity of a user associated with the client device, an indication of a television show or movie that the user is attempting to watch, an indication of content language, an indication of account settings associated with the user, or other associated information. In the example shown in FIG. 4, the manifest request 402 includes an indication of the title of the requested media content (e.g., "Citizen Kane" 403), an indication of the content language (e.g., English 404), an indication of the client device type (e.g., television 405), and an indication of the preferred resolution (e.g., 4K 406). Other information may also be provided. The server 407 may receive the manifest request (along with a license request having a corresponding license challenge for this flavor of media content) and then identify the specific multimedia stream that is to be provided to the client device 401. In this example, identifying the requested multimedia stream includes identifying a specific resolution (4k), a specific language (English), a specific title (Citizen Kane), and a specific device type (television). In other examples, identifying the requested multimedia stream may additionally (or alternatively) include identifying a specific encoding type (e.g., MP4), a specific audio format (7.1 surround), or other specifications for the media content item.

In some embodiments, each of these media content flavors may be stored on different nodes in a content delivery network (CDN). As mentioned above, CDN nodes may be geographically distributed all over the world. Each of these CDN nodes (e.g., nodes A-C in CDN 408) may have many media content items, and may include many different flavors of each media item. Thus, identifying the specified multimedia content stream 412 that is to be provided to the client device 401 may include identifying at least one content delivery network node that has stored thereon the requested multimedia content in the specified format. Thus, in FIG. 4, the client device 401 has requested a media content item with the following specifics: Citizen Kane, English, TV, 4K. The server 407 may communicate with the CDN 408 to determine where that specific flavor is located. The flavor in Node A (409) has the same title, the same device type (TV), and the same resolution (4K), but is in Spanish, not English. Thus, Node A (409) of the CDN 408 would not be able to provide the correct multimedia content stream. Node B (410) of CDN 408 includes a media item with the same requested title (Citizen Kane), the same language (English), and the same device type (TV), but is encoded at the wrong resolution (1080P). As such, Node B will also not be used to provide the requested media stream. Node C (411), however, has a media item with the correct flavor, with title, language, device type, and resolution all matching the requested flavor. Thus, Node C (411) will be used in this example to provide the requested multimedia content stream 412.

In some cases, the steps of identifying the correct CDN node to provide the requested multimedia content in the requested format and acquiring a license for the multimedia content may be performed in parallel. Thus, for example, the server 407 may communicate with the CDN 408 to identify which CDN node(s) have the correct media content flavor and, at the same time, may acquire a license for the specified content flavor in response to the license request received as part of the combined manifest and license request (e.g., 352 of FIG. 3B). Thus, when the correct CDN node has been identified, the license may be simultaneously acquired and provided along with the multimedia content stream 412 from the identified CDN node.

Figure 5:
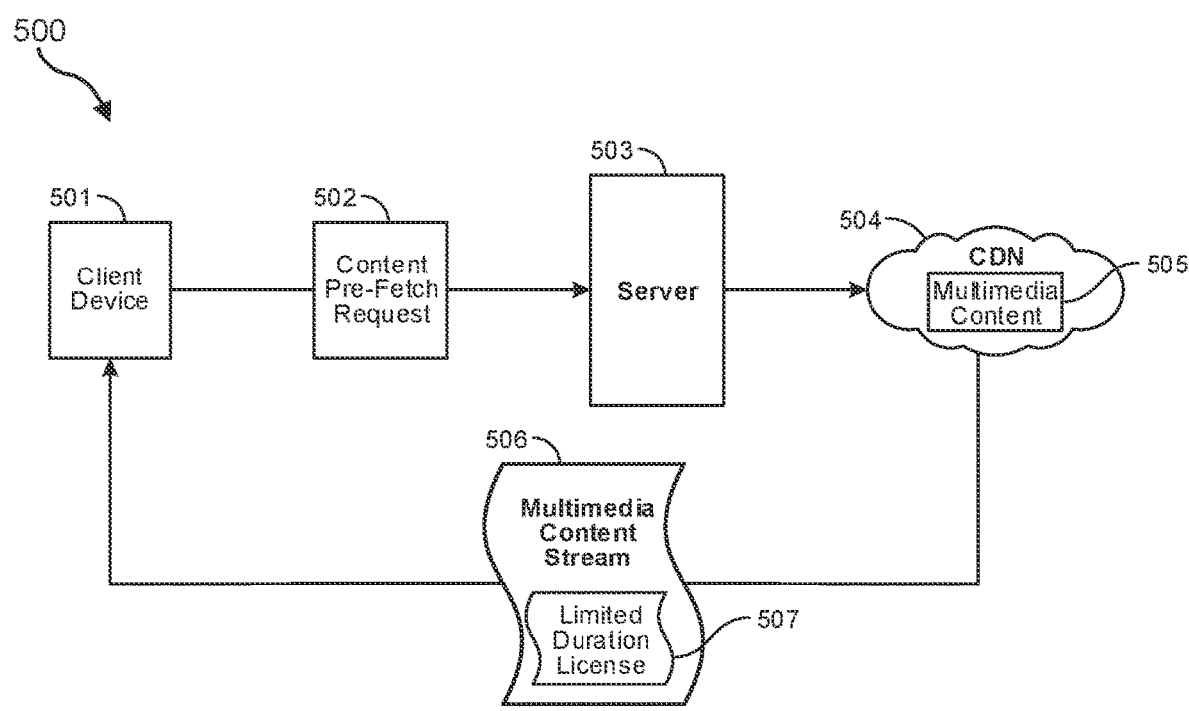
FIG. 5 illustrates a computing environment in which content is prefetched along with a limited duration license.

FIG. 5 illustrates an example computing environment 500 in which multimedia content may be at least initially provided to a client device using a limited duration license. As noted above, a limited duration license (LDL) may be a license that applies to a given media item and applies for a specified (limited) amount of time. Thus, an LDL may last for a few seconds, or for a minute, or for a few minutes. The duration of validity for the LDL may depend, at least in some cases, on the length of the corresponding media item. If the media item is shorter in length (e.g., 10 minutes), the LDL may only be valid for a shorter amount of time (e.g., N seconds), whereas if the media item is longer (e.g., 120 minutes in length), the LDL may be valid for a longer amount of time (e.g., N minutes). At some point, however, the LDL will no longer be valid, and the client device will need a full, standard license to continue watching (or listening to) the media item. After the full, standard license is received, the client device may seamlessly transition to the full license without disrupting playback.

FIG. 5 illustrates an embodiment in which a client device 501 sends a content pre-fetch request 502 to the server 503. The content pre-fetch request 502 may include a manifest request provided by the client device and/or a license request. The manifest request may include a specified minimum set of information needed to acquire at least one license for the specified multimedia content stream (e.g., multimedia content stream 506). This specified minimum set of information needed to acquire the license (e.g., an LDL and a standard duration license or just the standard duration license) for the multimedia content may include information used by a digital rights management (DRM) application programming interface (API) to access the at least one license. In some cases, for example, a digital rights management API or DRM license service may need certain types of information including, for instance, title and language. In some cases, other information about the client device or associated content subscriptions or user or device validations may be needed. The information needed by the DRM API may be different in different scenarios. The server 503 may be configured to determine the minimal amount of information needed by the DRM API and gather that information from the content pre-fetch request 502. The server 503 may then identify the location of the media content 505 on the CDN 504, and provide the multimedia content stream 506 to the client device 501 with a limited duration license 507 and/or with a standard duration license.

Figure 6:
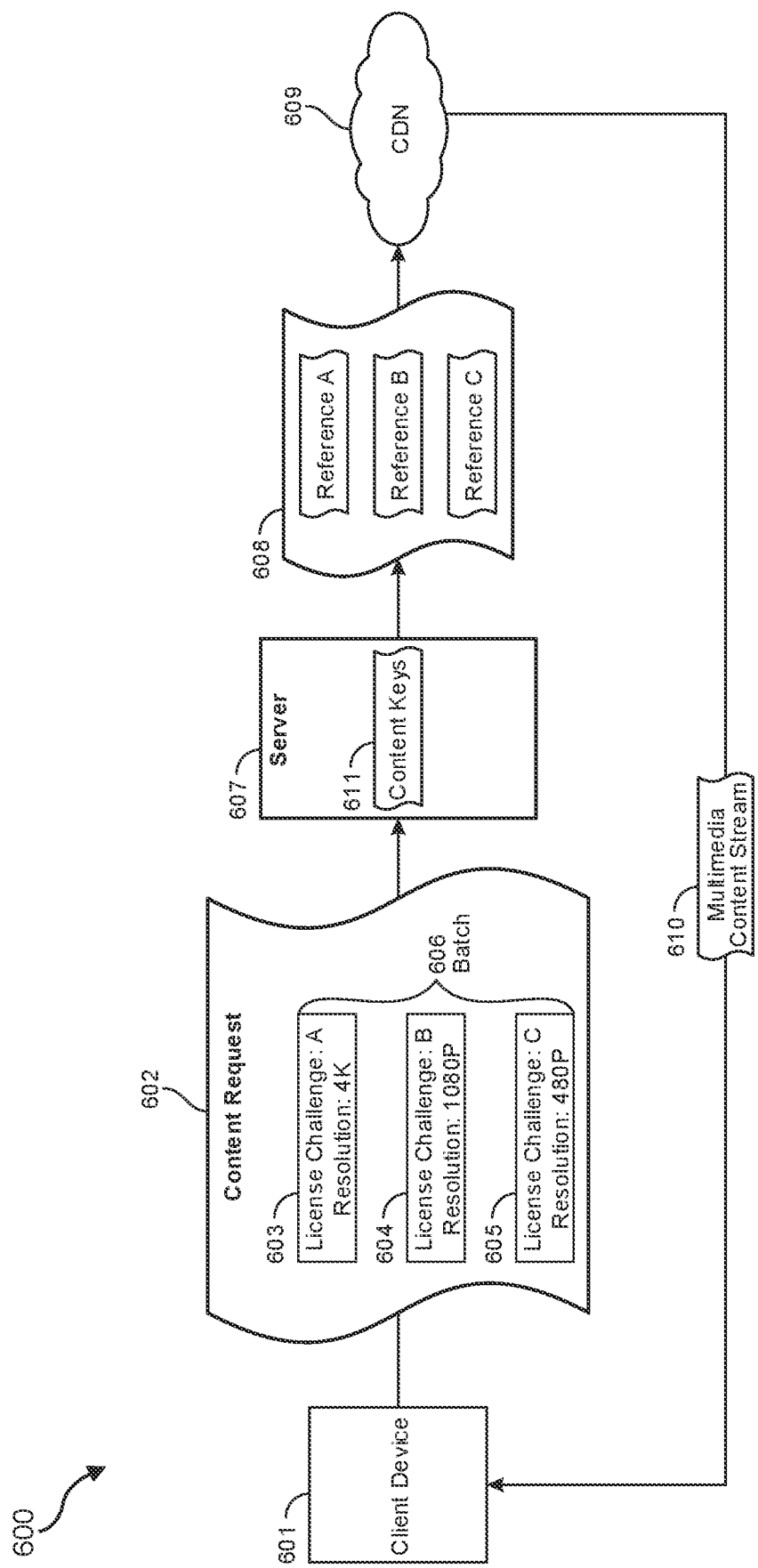
FIG. 6 illustrates a computing environment in which license challenges are batched and identified with references for content acquisition.

FIG. 6 illustrates an example computing environment 600 in which license challenges may be batched together. In some embodiments, a request for multimedia content (e.g., 602) may include a batch of multiple license challenges (e.g., 606) for different content resolutions. For example, instead of the client device 601 sending separate license challenges to acquire licenses for each level of resolution, the client device 601 may be configured to send multiple license challenges to the server 607 in a batch. The batch 606 may include license challenge A (603), requesting a title at a resolution of 4K. The batch 606 may also include license challenge B (604), requesting the same title at a resolution of 1080P, and license challenge C (605), requesting the title at a resolution of 480P. These may all be combined (along with potentially others) into batch 606 within content request 602. The server 607 may then acquire content keys 611 (i.e., license keys) for one or more of the license challenges 603-605. The server 607 may also generate references 608 to respectively match each of the license challenges to the content keys 611 (e.g., Reference A matches license challenge A to its corresponding content key, and so on). In some cases, the content keys provided in the license response to the license challenge may be identified based on information received in the manifest request from the client device 601. The references 608 may be passed to the CDN 609, after which the content may be streamed (at 610) back to the client device along with the media content's respective license.

Figure 7:
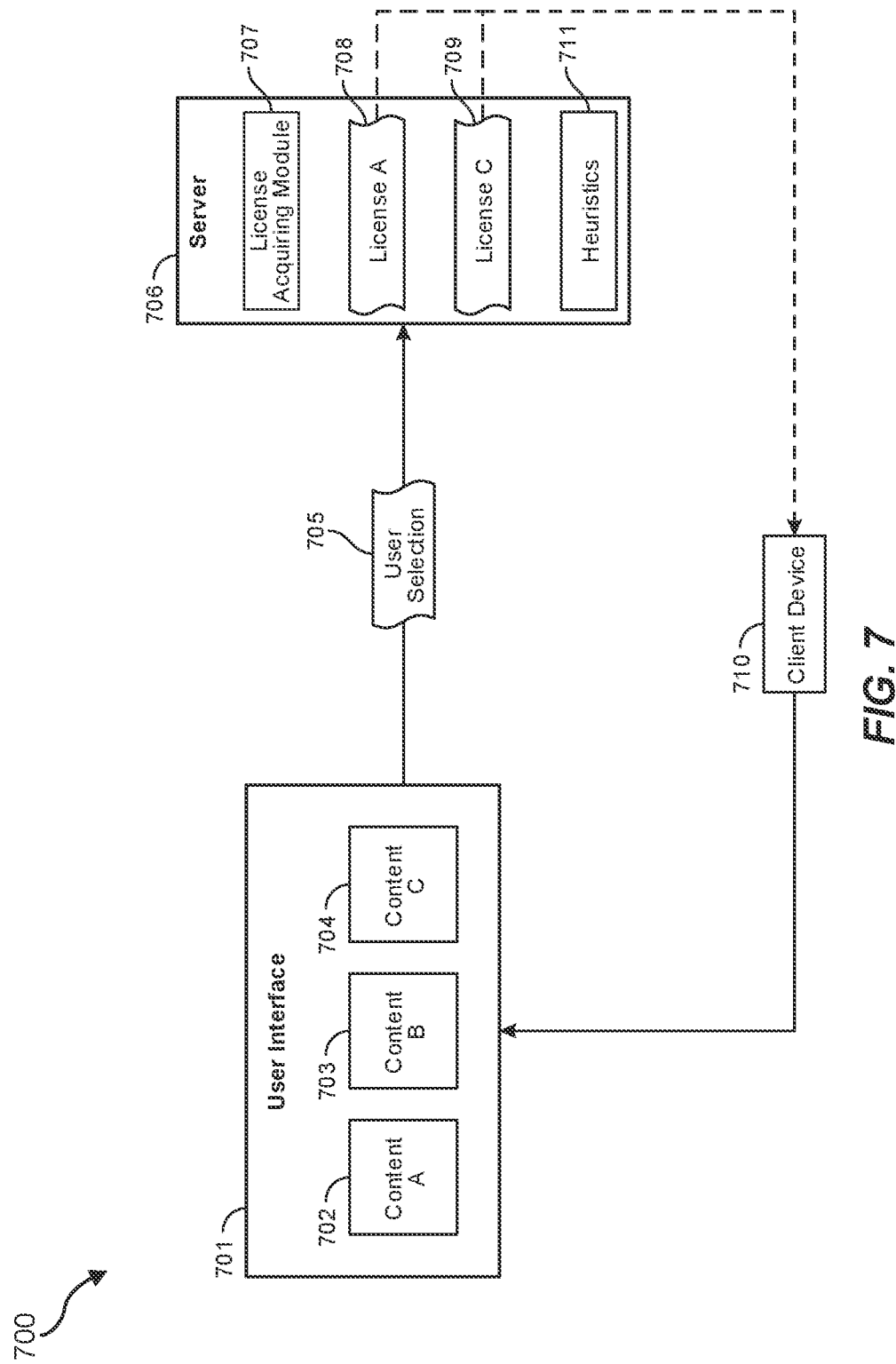
FIG. 7 illustrates a computing environment in which heuristics are implemented to peremptorily acquire licenses in advance of receiving corresponding license requests.

FIG. 7 illustrates an example computing environment 700 in which the embodiments described herein may implement heuristics to predict which multimedia content a user will select from a set of available multimedia content items and then preemptively acquire multimedia content licenses based on which multimedia content items the user is predicted to select. For example, a user may subscribe to a video streaming service. The user may open a video playback application provided by the video streaming service. The video playback application may be opened on a smartphone, on a television, on a tablet, on a PC, etc. The video playback application may provide a user interface (e.g., 701) that provides multiple different video items that are available for selection by the user. For instance, as shown in FIG. 7, the user interface may include content A (702), content B (703), and content C (704). Many more content items may be shown, and each content item may represent a movie, a television show, an internet video, a song, or other media item.

The video playback application may be configured to receive user inputs selecting a specific media item (e.g., by tapping on or clicking on an icon representing the content item). However, in some cases, even before the user provides this selection input 705, the server 706 may implement heuristics 711 to predict which multimedia content item the user is going to select from among those content items that are displayed on the user interface 701. The heuristics 711 may indicate, for example, based on content previously viewed by the user, or based on content viewed by others in a similar demographic, or based on location, or time of day, or type of device, or language, or based on other factors, the heuristics may predict that the user is most likely to select content A (702), followed by content C (704). In such cases, the license acquiring module 707 of server 706 may pre-emptively acquire license A (708) and/or license C (709) for corresponding content A (702) and/or content C (704). These licenses 708/709 may be limited duration licenses or standard duration licenses. The licenses 708/709 may then be passed to the client device 710 before the user has even provided their selection input 705. In such cases, if the user were to select content A (702) or content C (704), the client device 710 would already have the licenses, thus saving an even greater amount of time. In cases where an LDL is sent to the client device 710, a follow-up request may identify the actual selection, and the license acquiring module 707 of the server 706 may then send a standard duration license.

In some cases, heuristics may also be used to reduce the number of keys that are requested and transferred to the client device. For example, in at least some of the embodiments described herein, the client device (e.g., 710 of FIG. 7) may be configured to send multiple license challenges to the server 706. Instead of sending license challenges for every possible media content flavor, the client device may use heuristics or other logic to more accurately determine which keys will actually be used by the client device to playback media content. The heuristics may look at many different factors including device type, device capabilities (e.g., surround sound capabilities), the version of DRM software running on (or installed on) the client device, user preferences, past key usage, and other factors to reduce the number of keys requested down from a scope of all possible content keys to a smaller subset of keys. That smaller subset of keys may represent those content keys that are most likely to be used on the client device. Requesting a smaller subset of keys may reduce the amount of data transferred back and forth between the client device 710 and the server 706, thereby conserving network bandwidth.

In some embodiments, it may be possible that the client device 710 does not accurately predict all of the keys that are actually used by the client device for media content playback. In such cases, the server 706 may receive further license requests with license challenges that identify additional content keys or content licenses that are to be provided to the client device 710 in the response to the license challenge. These further license requests may be received, for example, after pre-fetching the most-likely-to-be-used manifests and licenses. In some cases, these further license requests may be batched together and sent as a single (subsequent) license request. The server 706 may keep track of the previously received license challenges and their affiliations with specific content keys. Indeed, the server 706 may maintain a mapping between license challenges and their associated content keys. Then, when subsequent license requests are received at the server 706, the server may consult the mapping to quickly match the subsequent license request with a specific content key (or set of keys). The server may then provide these additional content keys during the streaming of the first selection. Thereafter, if there is a transition to the subsequent content selection, the client device may begin preparation using the licenses received in response to the further license requests.

Additionally or alternatively, the server 706 may receive and implement a previously used license challenge from the client device. For instance, because in the embodiments described herein, the DRM headers are decoupled from the manifest response and license requests, the server 706 may permit the client device 710 to reuse challenges across requests. This may allow the client device to avoid generating or "minting" at least one license challenge. Indeed, at least in some cases, minting a license challenge may be a cryptographically complex process, requiring a relatively large amount of computing resources. By allowing the client device 710 to reuse a previously used license challenge, the client device 710 may be able to avoid minting one or even multiple different license challenges, thereby potentially reducing the amount of computing resources used to mint licenses, and may further accelerate the onset of playback, thereby reducing the amount of play delay. Reused license challenges may result from license challenges that were minted but did not receive license responses, and thus were not installed or used for playback. Accordingly, challenges that do not correspond with a license used for playback may be reused, potentially saving processing resources on the electronic device that previously minted the challenges.

Thus, in this manner, in the embodiments described above, a client device (e.g., 710) may send a single content request to the server 706. Digital Rights Management, contrary to prior traditional implementations, may not be exchanged with the client device 710. Indeed, in the embodiments herein, the DRM header may not be used for license generation. Rather, the source of truth for the server to use when adding a content key to the license response may be, irrespective of what may have been packaged in the combined manifest and license request, the playback context. In some embodiments, even in cases where the manifest and license requests are not combined into a single request, the server 706 may still remove the exchange of DRM headers from the media request and provisioning process, such that fetching of DRM headers may be unnecessary.

This may also allow for parallelization that was previously unobtainable. For instance, in the traditional media provisioning process, a client device would make separate manifest and license requests, allowing no room for server-side parallelization. In contrast, in the embodiments described herein, the server 706 may perform parts of manifest generation and license generation in parallel, such that the license provisioning process may be performed more quickly and efficiently. This parallelization may result in a measured reduction in play delay, allowing the user to begin viewing their selected media item much quicker than in traditional systems.

Still further, reducing the number of requests may also result in a reduction in transient errors that may occur when a request is transmitted over the public internet infrastructure. For example, if a low end device that has limited bandwidth and/or processing power can play back a media item with half of the number of back and forth trips traditionally required between the device and the server, the low end device (especially) will experience a much faster playback experience. Moreover, with fewer packets being transferred back and forth between clients and servers, network bandwidth may be improved, thereby reducing congestion and potentially reducing transmission errors caused by clogged data transmission pipelines. By combining the manifest and license requests into a single request, the embodiments described herein, at least in some embodiments, may also remove certain attack vectors which arise from having separate manifest and license requests. Because the manifest and license requests are combined, prior attack vectors that may have targeted manifest requests or license requests individually may be rebuffed and dismissed by the server.

In some embodiments, a computer-implemented method may be provided that includes generating, at a client device, a request for multimedia content, where the request includes both a manifest request that includes client identification data and a license request that includes a license challenge. The method may also include transmitting the generated request to a server device, allowing the request for multimedia content to be validated using the client identification data in the manifest request. Still further, the method may include receiving, from the server device, a multimedia content stream, including a generated manifest response and an acquired license. The method may also include playing back the received multimedia content stream on the client device using the generated manifest response and the acquired license.

In some cases, the multimedia content stream may be accessed using the generated manifest response that includes an identification of a specified multimedia content stream that is to be provided to the client device. Additionally or alternatively, the multimedia content stream may be further accessed using the license acquired in response to the license request. The license may include a response to the license challenge having various content keys. A client device (e.g., 710 of FIG. 7) may perform the above-described method in conjunction with a backend server such as server 706. These steps may contribute to a reduction in playback delay on the client side, thereby providing a more seamless playback experience, even on lower-tier devices that include fewer processing resources.

Accordingly, in this manner, using the embodiments described herein, the amount of playback delay experienced by a user may be substantially decreased. By combining the manifest request and license request into a single request, fewer messages may be sent between the client and the server, thereby reducing back-and-forth round trips, reducing bandwidth usage, and reducing client device resource usage. The embodiments described herein may provide a faster and more seamless playback experience, leading to increased user satisfaction and overall appeal of the underlying media provisioning service.

Figure 8:
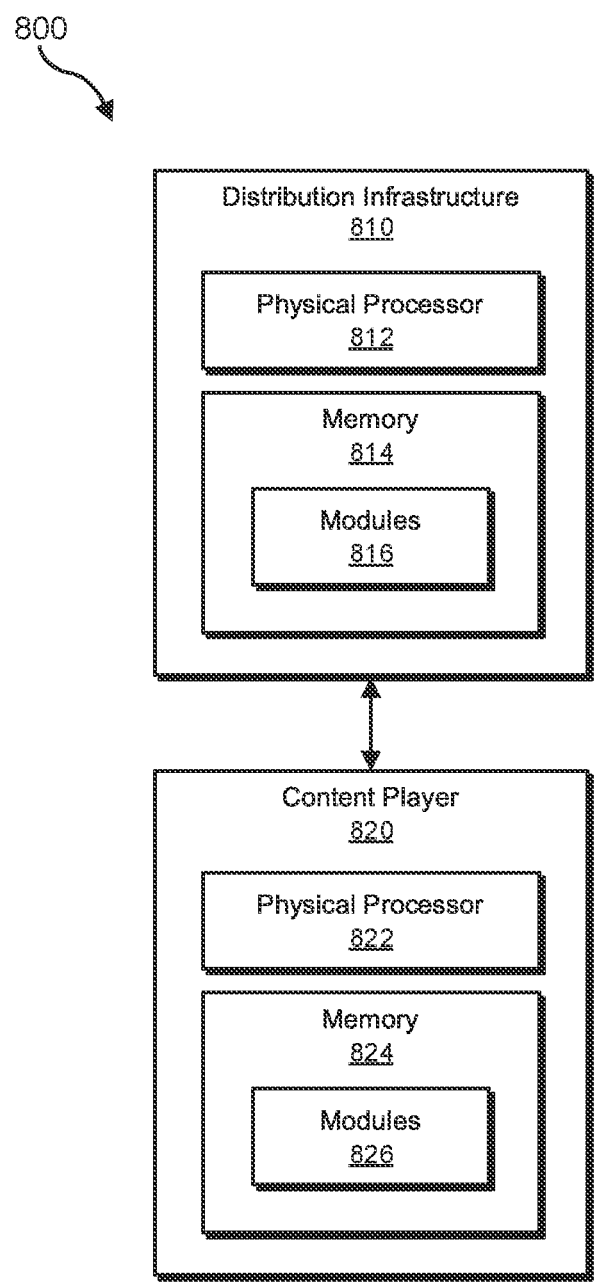
FIG. 8 is a block diagram of an exemplary content distribution ecosystem.
Figure 10:
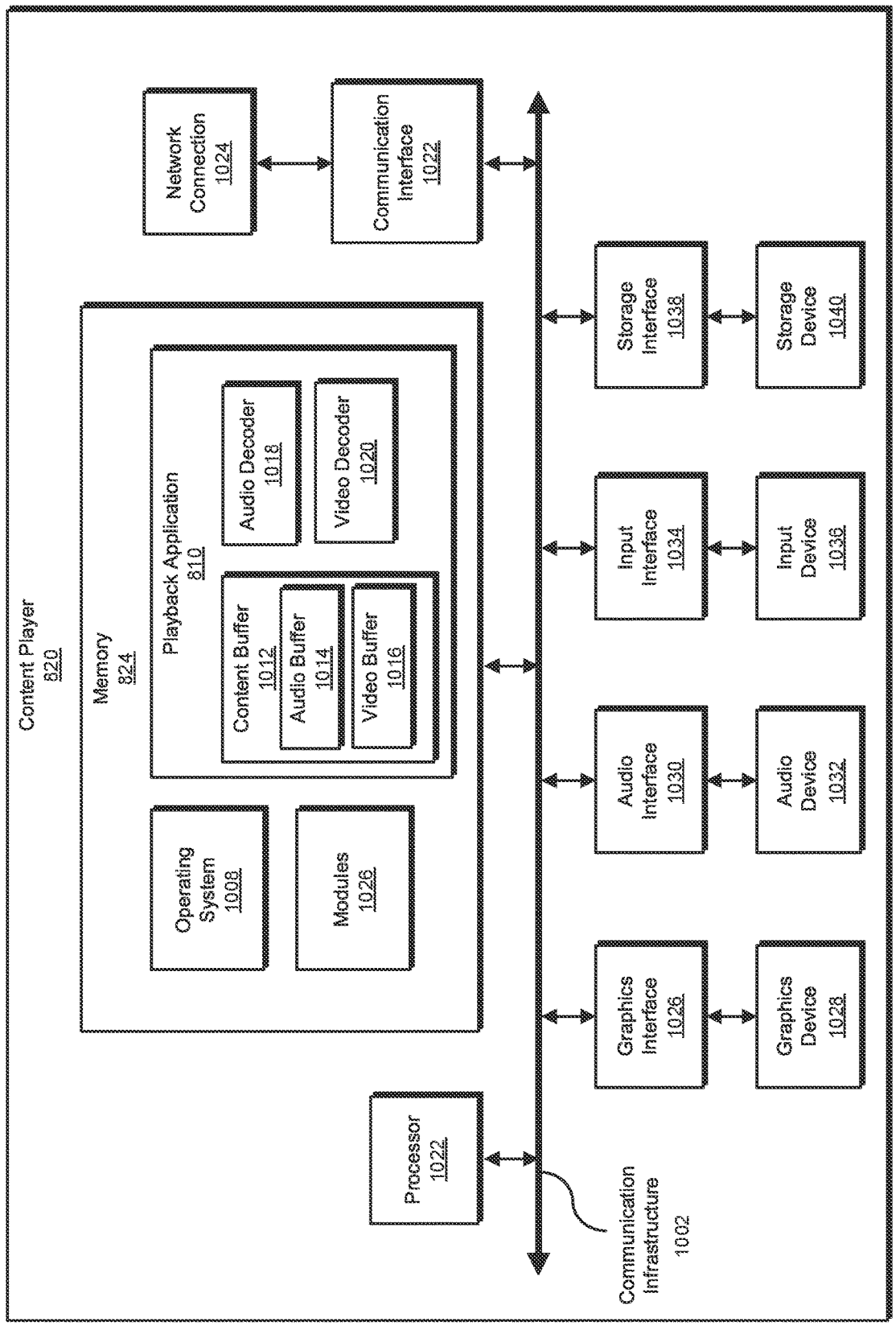
FIG. 10 is a block diagram of an exemplary content player within the content distribution ecosystem shown in FIG. 8.

The following will provide, with reference to FIG. 8, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-7.

FIG. 8 is a block diagram of a content distribution ecosystem 800 that includes a distribution infrastructure 810 in communication with a content player 820. In some embodiments, distribution infrastructure 810 is configured to encode data at a specific data rate and to transfer the encoded data to content player 820. Content player 820 is configured to receive the encoded data via distribution infrastructure 810 and to decode the data for playback to a user. The data provided by distribution infrastructure 810 includes, for example, audio, video, text, images, animations, interactive content, haptic data, virtual or augmented reality data, location data, gaming data, or any other type of data that is provided via streaming.

Distribution infrastructure 810 generally represents any services, hardware, software, or other infrastructure components configured to deliver content to end users. For example, distribution infrastructure 810 includes content aggregation systems, media transcoding and packaging services, network components, and/or a variety of other types of hardware and software. In some cases, distribution infrastructure 810 is implemented as a highly complex distribution system, a single media server or device, or anything in between. In some examples, regardless of size or complexity, distribution infrastructure 810 includes at least one physical processor 812 and at least one memory device 814. One or more modules 816 are stored or loaded into memory 814 to enable adaptive streaming, as discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 includes a physical processor 822, memory 824, and one or more modules 826. Some or all of the adaptive streaming processes described herein is performed or enabled by modules 826, and in some examples, modules 816 of distribution infrastructure 810 coordinate with modules 826 of content player 820 to provide adaptive streaming of multimedia content.

In certain embodiments, one or more of modules 816 and/or 826 in FIG. 8 represent one or more software applications or programs that, when executed by a computing device, cause the computing device to perform one or more tasks. For example, and as will be described in greater detail below, one or more of modules 816 and 826 represent modules stored and configured to run on one or more general-purpose computing devices. One or more of modules 816 and 826 in FIG. 8 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 812 and 822 generally represent any type or form of hardware-implemented processing unit capable of interpreting and/or executing computer-readable instructions. In one example, physical processors 812 and 822 access and/or modify one or more of modules 816 and 826, respectively. Additionally or alternatively, physical processors 812 and 822 execute one or more of modules 816 and 826 to facilitate adaptive streaming of multimedia content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 stores, loads, and/or maintains one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
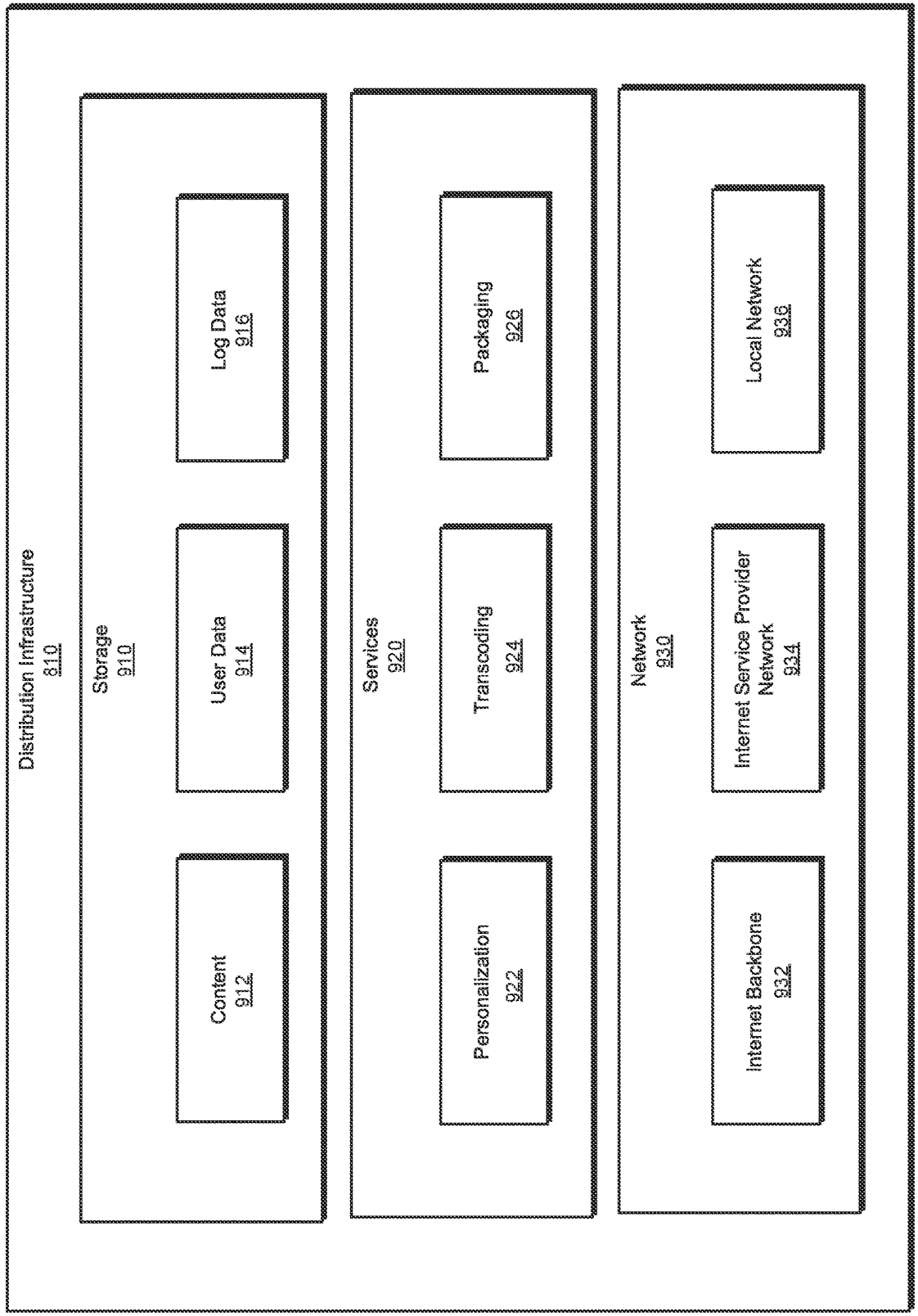
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 includes storage 910, services 920, and a network 930. Storage 910 generally represents any device, set of devices, and/or systems capable of storing content for delivery to end users. Storage 910 includes a central repository with devices capable of storing terabytes or petabytes of data and/or includes distributed storage systems (e.g., appliances that mirror or cache content at Internet interconnect locations to provide faster access to the mirrored content within certain regions). Storage 910 is also configured in any other suitable manner.

As shown, storage 910 may store a variety of different items including content 912, user data 914, and/or log data 916. Content 912 includes television shows, movies, video games, user-generated content, and/or any other suitable type or form of content. User data 914 includes personally identifiable information (PII), payment information, preference settings, language and accessibility settings, and/or any other information associated with a particular user or content player. Log data 916 includes viewing history information, network throughput information, and/or any other metrics associated with a user's connection to or interactions with distribution infrastructure 810.

Services 920 includes personalization services 922, transcoding services 924, and/or packaging services 926. Personalization services 922 personalize recommendations, content streams, and/or other aspects of a user's experience with distribution infrastructure 810. Encoding services 924 compress media at different bitrates which, as described in greater detail below, enable real-time switching between different encodings. Packaging services 926 package encoded video before deploying it to a delivery network, such as network 930, for streaming.

Network 930 generally represents any medium or architecture capable of facilitating communication or data transfer. Network 930 facilitates communication or data transfer using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 includes an Internet backbone 932, an internet service provider 934, and/or a local network 936. As discussed in greater detail below, bandwidth limitations and bottlenecks within one or more of these network segments triggers video and/or audio bit rate adjustments.

FIG. 10 is a block diagram of an exemplary implementation of content player 820 of FIG. 8. Content player 820 generally represents any type or form of computing device capable of reading computer-executable instructions. Content player 820 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 includes a communication infrastructure 1002 and a communication interface 1022 coupled to a network connection 1024. Content player 820 also includes a graphics interface 1026 coupled to a graphics device 1028, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 stores and/or loads an operating system 1008 for execution by processor 822. In one example, operating system 1008 includes and/or represents software that manages computer hardware and software resources and/or provides common services to computer programs and/or applications on content player 820.

Operating system 1008 performs various system management functions, such as managing hardware components (e.g., graphics interface 1026, audio interface 1030, input interface 1034, and/or storage interface 1038). Operating system 1008 also provides process and memory management models for playback application 1010. The modules of playback application 1010 includes, for example, a content buffer 1012, an audio decoder 1018, and a video decoder 1020.

Playback application 1010 is configured to retrieve digital content via communication interface 1022 and play the digital content through graphics interface 1026. Graphics interface 1026 is configured to transmit a rendered video signal to graphics device 1028. In normal operation, playback application 1010 receives a request from a user to play a specific title or specific content. Playback application 1010 then identifies one or more encoded video and audio streams associated with the requested title. After playback application 1010 has located the encoded streams associated with the requested title, playback application 1010 downloads sequence header indices associated with each encoded stream associated with the requested title from distribution infrastructure 810. A sequence header index associated with encoded content includes information related to the encoded sequence of data included in the encoded content.

In one embodiment, playback application 1010 begins downloading the content associated with the requested title by downloading sequence data encoded to the lowest audio and/or video playback bitrates to minimize startup time for playback. The requested digital content file is then downloaded into content buffer 1012, which is configured to serve as a first-in, first-out queue. In one embodiment, each unit of downloaded data includes a unit of video data or a unit of audio data. As units of video data associated with the requested digital content file are downloaded to the content player 820, the units of video data are pushed into the content buffer 1012. Similarly, as units of audio data associated with the requested digital content file are downloaded to the content player 820, the units of audio data are pushed into the content buffer 1012. In one embodiment, the units of video data are stored in video buffer 1016 within content buffer 1012 and the units of audio data are stored in audio buffer 1014 of content buffer 1012.

A video decoder 1020 reads units of video data from video buffer 1016 and outputs the units of video data in a sequence of video frames corresponding in duration to the fixed span of playback time. Reading a unit of video data from video buffer 1016 effectively de-queues the unit of video data from video buffer 1016. The sequence of video frames is then rendered by graphics interface 1026 and transmitted to graphics device 1028 to be displayed to a user.

An audio decoder 1018 reads units of audio data from audio buffer 1014 and output the units of audio data as a sequence of audio samples, generally synchronized in time with a sequence of decoded video frames. In one embodiment, the sequence of audio samples is transmitted to audio interface 1030, which converts the sequence of audio samples into an electrical audio signal. The electrical audio signal is then transmitted to a speaker of audio device 1032, which, in response, generates an acoustic output.

In situations where the bandwidth of distribution infrastructure 810 is limited and/or variable, playback application 1010 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1026 is configured to generate frames of video data and transmit the frames of video data to graphics device 1028. In one embodiment, graphics interface 1026 is included as part of an integrated circuit, along with processor 822. Alternatively, graphics interface 1026 is configured as a hardware accelerator that is distinct from (i.e., is not integrated within) a chipset that includes processor 822.

Graphics interface 1026 generally represents any type or form of device configured to forward images for display on graphics device 1028. For example, graphics device 1028 is fabricated using liquid crystal display (LCD) technology, cathode-ray technology, and light-emitting diode (LED) display technology (either organic or inorganic). In some embodiments, graphics device 1028 also includes a virtual reality display and/or an augmented reality display. Graphics device 1028 includes any technically feasible means for generating an image for display. In other words, graphics device 1028 generally represents any type or form of device capable of visually displaying information forwarded by graphics interface 1026.

As illustrated in FIG. 10, content player 820 also includes at least one input device 1036 coupled to communication infrastructure 1002 via input interface 1034. Input device 1036 generally represents any type or form of computing device capable of providing input, either computer or human generated, to content player 820. Examples of input device 1036 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 820 also includes a storage device 1040 coupled to communication infrastructure 1002 via a storage interface 1038. Storage device 1040 generally represents any type or form of storage device or medium capable of storing data and/or other computer-readable instructions. For example, storage device 1040 is a magnetic disk drive, a solid-state drive, an optical disk drive, a flash drive, or the like. Storage interface 1038 generally represents any type or form of interface or device for transferring data between storage device 1040 and other components of content player 820.

Many other devices or subsystems are included in or connected to content player 820. Conversely, one or more of the components and devices illustrated in FIG. 10 need not be present to practice the embodiments described and/or illustrated herein. The devices and subsystems referenced above are also interconnected in different ways from that shown in FIG. 10. Content player 820 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 820. All or a portion of the computer program stored on the computer-readable medium is then stored in memory 824 and/or storage device 1040. When executed by processor 822, a computer program loaded into memory 824 causes processor 822 to perform and/or be a means for performing the functions of one or more of the example embodiments described and/or illustrated herein. Additionally or alternatively, one or more of the example embodiments described and/or illustrated herein are implemented in firmware and/or hardware. For example, content player 820 is configured as an Application Specific Integrated Circuit (ASIC) adapted to implement one or more of the example embodiments disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example Embodiments:

1. A computer-implemented method comprising: receiving, from a client device, a request for multimedia content, the request comprising both a manifest request that includes client identification data and a license request that includes a license challenge, validating the received request for multimedia content using the client identification data in the manifest request, generating a manifest response that includes an identification of a specified multimedia content stream that is to be provided to the client device, acquiring at least one license in response to the license request, the license including a response to the license challenge having one or more content keys, and providing the specified multimedia content stream, including the generated manifest response and the acquired license, to the client device.

2. The computer-implemented method of claim 1, wherein the multimedia content is provided to the client device via one or more multimedia content streams.

3. The computer-implemented method of claim 2, further comprising determining which multimedia content streams to provide to the client based on one or more portions of information provided in the received manifest request.

4. The computer-implemented method of claim 3, wherein the one or more portions of information provided in the manifest request includes an indication of the client device's device type, an indication of a network to which the client device is connected, an indication of an identity of a user associated with the client device, an indication of a television show or movie that the user is attempting to watch, or an indication of account settings associated with the user.

5. The computer-implemented method of claim 1, wherein identifying the specified multimedia stream that is to be provided to the client device comprises identifying at least one of a specific encoding type, a specific resolution, a specific audio format, or a specific language.

6. The computer-implemented method of claim 5, wherein identifying the specified multimedia stream that is to be provided to the client device comprises identifying at least one content delivery network node that has stored there on the requested multimedia content in the specified format.

7. The computer-implemented method of claim 6, wherein the steps of identifying at least one content delivery network node that has stored there on the requested multimedia content in the specified format and acquiring at least one license in response to the license request are performed in parallel.

8. The computer-implemented method of claim 1, wherein the specified multimedia content stream is at least initially provided to the client device using a limited duration license.

9. The computer-implemented method of claim 1, wherein the manifest request provided by the client device includes a specified minimum set of information needed to acquire the at least one license for the specified multimedia content stream.

10. The computer-implemented method of claim 9, wherein the specified minimum set of information needed to acquire the at least one license for the specified multimedia content stream comprises a minimum set of information used by a digital rights management (DRM) application programming interface (API) to access the at least one license.

11. The computer-implemented method of claim 1, wherein the content keys provided in the license response to the license challenge are identified based on information received in the manifest request from the client device.

12. A system comprising: at least one physical processor and physical memory comprising computer-executable instructions that, when executed by the physical processor, cause the physical processor to: receive, from a client device, a request for multimedia content, the request comprising both a manifest request that includes client identification data and a license request that includes a license challenge, validate the received request for multimedia content using the client identification data in the manifest request, generate a manifest response that includes an identification of a specified multimedia content stream that is to be provided to the client device, acquire at least one license in response to the license request, the license including a response to the license challenge having one or more content keys, and provide the specified multimedia content stream, including the generated manifest response and the acquired license, to the client device.

13. The system of claim 12, wherein the request for multimedia content received from the client device comprises a prefetch request.

14. The system of claim 13, wherein the license acquired in response to the license request comprises at least one of a limited duration license or a standard duration license.

15. The system of claim 12, wherein the request for multimedia content includes a batch of multiple license challenges for a respective plurality of multimedia content resolutions, and wherein the system generates references to track which content keys are referred to in each license challenge.

16. The system of claim 12, further comprising receiving one or more further license requests with at least one challenge that identifies one or more additional content keys that are to be provided to the client device in the response to the license challenge.

17. The system of claim 12, further comprising implementing one or more heuristics to predict which multimedia content a user will select from a set of available multimedia content items.

18. The system of claim 17, further comprising preemptively acquiring one or more multimedia content licenses based on which multimedia content items the user is predicted to select.

19. The system of claim 12, further comprising receiving and implementing a previously used license challenge from the client device, allowing the client device to avoid minting at least one license challenge.

20. A non-transitory computer-readable medium comprising one or more computer-executable instructions that, when executed by at least one processor of a computing device, cause the computing device to: receive, from a client device, a request for multimedia content, the request comprising both a manifest request that includes client identification data and a license request that includes a license challenge, validate the received request for multimedia content using the client identification data in the manifest request, generate a manifest response that includes an identification of a specified multimedia content stream that is to be provided to the client device, acquire at least one license in response to the license request, the license including a response to the license challenge having one or more content keys, and provide the specified multimedia content stream, including the generated manifest response and the acquired license, to the client device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to acquire a license, use the result of the transformation to provide a license alongside requested content, and store the result of the transformation for future content requests. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, from a client device, a request for a specific flavor of multimedia content that is stored on one or more content delivery nodes, the request comprising both a manifest request having client identification data and a license request that includes a license challenge;
validating the received request for the specified flavor of multimedia content using the client identification data in the manifest request;
generating a manifest response that includes an identification of a specified multimedia content stream that corresponds to the specified flavor of multimedia content;
performing in parallel:
determining which content delivery node has the specified flavor of multimedia content stored thereon; and
acquiring at least one license in response to the license request, the license including a response to the license challenge; and
providing the specified multimedia content stream from the determined content delivery node, including the generated manifest response and the acquired license, to the client device.

2. The computer-implemented method of claim 1, wherein the specified flavor of multimedia content specifies at least one of: content title, content language, playback device type, playback resolution, encoding type, or audio format.

3. The computer-implemented method of claim 2, wherein the corresponding multimedia content stream includes at least one of the specified content title, content language, playback device type, playback resolution, encoding type, or audio format.

4. The computer-implemented method of claim 1, wherein determining which content delivery node has the specified flavor of multimedia content stored thereon includes querying a plurality of content delivery nodes in a content delivery network.

5. The computer-implemented method of claim 1, wherein the request for the specified flavor of multimedia content received from the client device comprises a prefetch request, and wherein the license acquired in response to the license request comprises a limited duration license.

6. The computer-implemented method of claim 1, wherein the request for the specified flavor of multimedia content received from the client device comprises a standard request, and wherein the license acquired in response to the license request comprises a standard duration license.

7. The computer-implemented method of claim 1, wherein the license challenge includes one or more content keys.

8. The computer-implemented method of claim 7, wherein the content keys provided in the license response to the license challenge are identified based on information received in the manifest request from the client device.

9. The computer-implemented method of claim 1, wherein the manifest request provided by the client device includes a specified minimum set of information needed to acquire the at least one license for the specified multimedia content stream.

10. The computer-implemented method of claim 9, wherein the specified minimum set of information needed to acquire the at least one license for the specified multimedia content stream comprises a minimum set of information used by a digital rights management (DRM) application programming interface (API) to access the at least one license.

11. A system comprising:
at least one physical processor; and
physical memory comprising computer-executable instructions that, when executed by the physical processor, cause the physical processor to:
receive, from a client device, a request for a specific flavor of multimedia content that is stored on one or more content delivery nodes, the request comprising both a manifest request having client identification data and a license request that includes a license challenge;
validate the received request for the specified flavor of multimedia content using the client identification data in the manifest request;
generate a manifest response that includes an identification of a specified multimedia content stream that corresponds to the specified flavor of multimedia content;
perform in parallel:
determine which content delivery node has the specified flavor of multimedia content stored thereon; and
acquire at least one license in response to the license request, the license including a response to the license challenge; and
provide the specified multimedia content stream from the determined content delivery node, including the generated manifest response and the acquired license, to the client device.

12. The system of claim 11, further comprising implementing one or more heuristics to predict which multimedia content a user will select from a set of available multimedia content items.

13. The system of claim 12, further comprising preemptively acquiring one or more multimedia content licenses based on which multimedia content items the user is predicted to select.

14. The system of claim 11, further comprising receiving and implementing a previously used license challenge from the client device, allowing the client device to avoid minting at least one license challenge.

15. The system of claim 11, wherein the specified flavor of multimedia content specifies at least one of: content title, content language, playback device type, playback resolution, encoding type, or audio format.

16. The system of claim 15, wherein the corresponding multimedia content stream includes at least one of the specified content title, content language, playback device type, playback resolution, encoding type, or audio format.

17. The system of claim 11, wherein determining which content delivery node has the specified flavor of multimedia content stored thereon includes querying a plurality of content delivery nodes in a content delivery network.

18. The system of claim 11, wherein the request for the specified flavor of multimedia content received from the client device comprises a prefetch request, and wherein the license acquired in response to the license request comprises a limited duration license.

19. The system of claim 11, wherein the request for the specified flavor of multimedia content received from the client device comprises a standard request, and wherein the license acquired in response to the license request comprises a standard duration license.

20. A non-transitory computer-readable medium comprising one or more computer-executable instructions that, when executed by at least one processor of a computing device, cause the computing device to:
receive, from a client device, a request for a specific flavor of multimedia content that is stored on one or more content delivery nodes, the request comprising both a manifest request having client identification data and a license request that includes a license challenge;
validate the received request for the specified flavor of multimedia content using the client identification data in the manifest request;
generate a manifest response that includes an identification of a specified multimedia content stream that corresponds to the specified flavor of multimedia content;
perform in parallel:
  determine which content delivery node has the specified flavor of multimedia content stored thereon; and
  acquire at least one license in response to the license request, the license including a response to the license challenge; and
provide the specified multimedia content stream from the determined content delivery node, including the generated manifest response and the acquired license, to the client device.

* * * * *